US006231815B1

(12) United States Patent
Bainczyk et al.

(10) Patent No.: US 6,231,815 B1
(45) **Date of Patent: *May 15, 2001**

(54) STORAGE AND TRANSPORT SYSTEM FOR SAMPLE MATERIAL

(75) Inventors: Gregor Bainczyk, Mannheim; Rolf Nagel, Bürstadt; Helmut Leininger, Mannheim; Rolf Lerch, Ilvesheim, all of (DE)

(73) Assignee: Roche Diagnostics GmbH, Mannheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/974,481

(22) Filed: Nov. 20, 1997

(30) Foreign Application Priority Data

| | | |
|---|---|---|
| Dec. 3, 1996 | (DE) | 196 49 938 |
| Oct. 9, 1997 | (DE) | 197 44 550 |

(51) Int. Cl.[7] .............................. G01N 1/10; G01N 1/18

(52) U.S. Cl. .............................. 422/102; 427/61; 206/204; 73/864.72; 435/307.1

(58) Field of Search .............................. 435/307.1, 304.1; 206/204; 422/58, 61, 99, 100, 102, 104; 73/864.71, 864.72

(56) References Cited

U.S. PATENT DOCUMENTS

| | | | | |
|---|---|---|---|---|
| 2,317,882 | * | 4/1943 | Boesel | 215/37 |
| 3,487,275 | * | 12/1969 | Perrin et al. | 317/234 |
| 4,394,144 | * | 7/1983 | Aoki | 55/281 |
| 4,559,949 | * | 12/1985 | Levine | 436/66 |
| 4,667,817 | * | 5/1987 | Im et al. | 206/204 |
| 4,816,224 | | 3/1989 | Vogel et al. . | |
| 4,834,234 | * | 5/1989 | Sacherer et al. | 206/204 |
| 5,183,742 | | 2/1993 | Omoto et al. . | |
| 5,186,843 | | 2/1993 | Baumgardner et al. . | |
| 5,262,067 | | 11/1993 | Wilk et al. . | |
| 5,478,752 | | 12/1995 | Lerch et al. . | |
| 5,520,041 | * | 5/1996 | Haswell | 73/29.04 |
| 5,783,759 | | 7/1998 | Wielinger et al. . | |

FOREIGN PATENT DOCUMENTS

63243756 * 3/1987 (JP) .

OTHER PUBLICATIONS

Clinical Chemistry vol. 29, pp.1080–1082 (1983).

Clinical Chemistry, vol. 28, pp. 386–387 (1982).

Clinical Chemistry, vol. 32, pp. 869–871 (1986).

DIN 53106 (May 1981) and English translation.

* cited by examiner

*Primary Examiner*—Lyle A. Alexander
(74) *Attorney, Agent, or Firm*—Fulbright & Jaworski, LLP

(57) ABSTRACT

The invention concerns a system for the storage and transport of sample material on absorbent material which is characterized in that the system contains no test reagents and it additionally includes a closable container containing a medium that can absorb moisture such as a desiccant in addition to the absorbent material for absorbing a liquid sample. Furthermore the system according to the invention can contain an agent to stabilize the sample material and optionally further auxiliary substances.

18 Claims, 1 Drawing Sheet

STORAGE AND TRANSPORT SYSTEM FOR SAMPLE MATERIAL

FIELD OF THE INVENTION

The invention concerns a system for storing and transporting sample material on absorbent material.

BACKGROUND OF THE INVENTION

The glycation of haemoglobin and serum proteins is increased in patients with diabetes mellitus. The increase is dependent on the glucose concentration and the incubation period of the protein with glucose. In these cases the serum proteins, including haemoglobin, are not glycated enzymatically but rather by means of an uncatalysed chemical reaction of glucose with amino groups of proteins. Experts assume that the concentration of a particular protein-glucose adduct reflects the glucose concentration over a particular period as well as the turn-over rate of the protein. Glycated haemoglobin is regarded as an indicator of the average blood glucose concentration during the last two to three months before the blood collection and examination. Glycated serum protein shows the blood glucose concentration during a shorter period of time. The determination of glycated protein such as glycated haemoglobin ($HbA_{1c}$) or glycated serum protein is therefore considerably important for the long-term glycemic control of diabetes patients.

In order to examine blood for the content of glycated protein the sample must often be transported to a far distant laboratory. The content of glycated protein in the sample should not change during this transport period and during a possible subsequent waiting period. The examination of blood samples which had been stored for a long period for glycated haemoglobin is reported in Clinical Chemistry 29, 1080–1082 (1983). This shows that whole blood can be stored up to 21 days at room temperature with essentially no change in the $HbA_{1c}$ content.

However, the transport of liquid blood samples is complicated and involves risks such as breakage of the transport vessel. In addition the puncture of a vein is necessary to collect whole blood although the small amounts obtained by withdrawing capillary blood from the finger pad would be sufficient for the analysis. Thus methods have been developed for the transport and analysis of smaller amounts of sample in which capillary blood is applied to filter paper and allowed to dry there. The filter paper is subsequently transported to the site of the examination. Here a disk containing the sample is cut out from the filter paper, eluted and the eluate is examined. The report in Clinical Chemistry 28, 386–387 (1982) refers to such a method. In this report it is stated that the content of glycated protein changes considerably compared to the original sample during blood sample storage on filter paper. After storage of whole blood on filter paper considerably increased measured values for glycated protein are found.

The impregnation of filter paper with glucose oxidase to prevent the increase in the content of glycated haemoglobin caused by storage of blood on filter paper is described in Clinical Chemistry 32, 869–871 (1986). However, impregnation with glucose oxidase was not able to completely prevent the increase of glycated protein. The false increase in the values can only be reduced by this measure. A further disadvantage of impregnating with glucose oxidase is its own instability during storage under the usual storage conditions.

Similar conclusions are reached by an article in Diabetes Care 10, 352–355 (1987). Here it is reported that the treatment of filter paper with glucose oxidase or with ethanol cannot satisfactorily prevent a false increase in the values for glycated haemoglobin when blood is stored on filter paper.

Apart from the poor stability of the sample, a further disadvantage of the methods described in the state of the art for the transport and storage of sample materials is that the liquid sample has to be completely dried before the final packaging. For this the filter paper has to be typically dried for 10 to 60 minutes in the air. Incompletely dried samples can lead to non-reproducible test results or for example contaminate the shipping packaging.

OBJECT AND SUMMARY OF THE INVENTION

The object of the present invention was therefore to eliminate the disadvantages of the state of the art. In particular the content of glycated protein should be stabilized in a sample when stored on an absorbent material. After storage of the glycated protein on an absorbent material a value should be found for the glycated protein which corresponds to that found after sample collection and before storage. Furthermore it should simplify the handling of the carrier containing the sample material and make it safer.

This object is achieved by the subject matter characterized in more detail in the patent claims.

The invention concerns a system for storing and transporting sample material. The system is composed of an absorbent material for absorbing a liquid sample, a closable container in which the material can be stored and transported and a moisture absorbent medium.

An essential feature of the system according to the invention is that the system itself contains no test reagents. In particular the absorbent material which serves to absorb the sample material contains no test reagents.

In this connection test reagents are those reagents or substances which are usually contained in analytical test elements such as colorimetric test strips or electrochemical sensors and biosensors and are used to detect a target analyte. In other words test reagents are substances which interact with the target analyte and allow it to be directly or indirectly detected i.e. optionally not until after the addition of other reagents. Examples are enzymes, coenzymes, dyes, mediators, pH and redox indicators, immunological detection reagents such as antibodies or antigens, ionophores, complexing agents etc..

Test reagents do not include reagents or substances that are not used directly to detect a target analyte. Such substances must not interact with the target analyte in the sample in a manner which would allow its detection. Examples of these are stabilizers, which are also understood to include enzyme substrates and coenzymes which mainly serve to stabilize the analyte, buffer substances, spreading agents and other common substances familiar to a person skilled in the art.

DETAILED DESCRIPTION OF THE INVENTION

Figure 1:
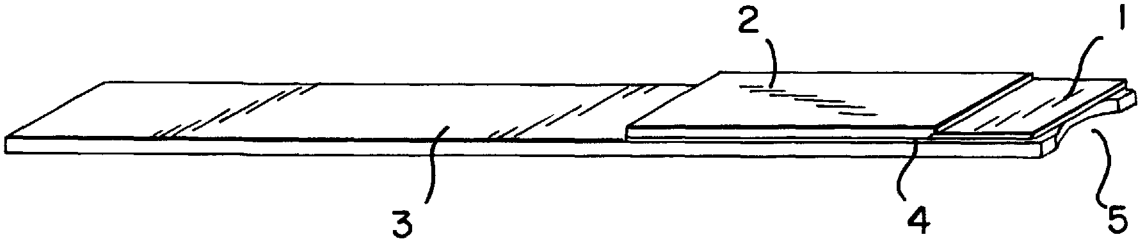
FIG. 1 is a preferred embodiment of an element according to the present invention.

The system according to the invention is suitable for transporting and storing sample material to be analysed especially liquid samples and above all body fluids such as blood, plasma, serum, urine, saliva etc. The element according to the invention is particularly preferably used to transport and store blood samples.

Papers, filter papers, fleeces, fabrics, knitted fabrics and membranes which are optionally attached to an additional inert support as are known to a person skilled in the art have proven to be suitable as absorbent materials for the system according to the invention. Fibrous materials are preferably used as absorbent materials although basically non-fibrous materials such as for example membranes can also be used. Preferred fibrous absorbent materials are fleeces, fabrics or knitted fabrics. Fleeces are quite especially preferred. The fibrous materials can contain glass, cellulose, polyester fibres and also viscose and polyvinyl alcohol. Fleece materials containing meltable copolyester fibres in addition to glass fibres, polyester fibres, polyamide fibres, cellulose fibres or cellulose derivative fibres as described in the European Patent Application 0 571 941 can also be used advantageously in the element according to the invention.

Depending on the analyte to be analysed it must be ensured that it can subsequently be reproducibly eluted again after application and drying of the sample material on the absorbent material. For this purpose a person skilled in the art can carry out simple elution experiments in order to be certain.

The absorbency can be determined according to DIN 53106. For this purpose the lower end of samples of 200+/−1 mm in length and 15+/−0.1 mm in width are immersed perpendicularly 25 mm into distilled water and the distance which the water migrates within 10 min is measured in mm. A person skilled in the art knows how different absorbencies can be adjusted in materials with the same components. For example when manufacturing fleeces different thicknesses can be used. The thicker the fibres used the lower is the absorbency. A further method is to vary the density of fleeces. The absorbency is reduced by an increase in density.

When using fabrics, fabrics with finer fibres have a higher absorbency than fabrics with coarser fibres. However, the absorbency can also be controlled by different types of twisting of the threads. In addition variations in the absorbency can be achieved via the type of weaving. Further possibilities for varying the absorbency can be achieved by using different mixtures of fibres. Thus for example the absorbency is reduced by the addition of hydrophobic fibres.

Stiff materials come into particular consideration as the inert support material for the absorbent materials that can be used according to the invention such as for example plastic foils, cardboard, coated paper etc.

The absorbent material is attached to the inert support material in such a way that the uptake of liquid by the absorbent materials is not impaired. This can be achieved by using a double-sided adhesive tape or for example also by using hot-melt adhesive.

In a particularly preferred embodiment of the invention the two layers of absorbent material are located on the support material next to and touching one another in such a way that liquid can pass from the first layer into the second layer when the first layer is filled with liquid. The absorbency of the matrix material of the first layer should be the same as or greater than that of the second neighbouring layer. This avoids the development of interfering suction effects when sample material is applied to the first layer.

In the particularly preferred embodiment described above the layers of the absorbent material must be attached to the inert support in such a way that the first layer can be completely separated from the second layer after applying and drying the liquid sample material. This is especially possible when the first layer is only attached relatively loosely or at certain points.

Furthermore in the particularly preferred embodiment described above the two layers of absorbent material must be located on the support material next to and touching one another in such a way that liquid can pass from the first layer into the second layer when the first layer is filled with liquid. This is then possible when at least the edges of the two layers are touching. It is even better, however, if there is a slight overlap of the two layers. It is particularly preferred that the layers are arranged such that the second layer slightly overlaps the first layer.

For the particularly preferred embodiment described above the size of the absorbent material layers must be selected such that the first layer, which is later also to be used as the analytical layer, can be completely filled with the sample liquid. Excess sample liquid is then taken up by the second layer. The amounts of sample that are adequate to determine a particular analyte depends on the type of analyte to be determined. However, as a rule 5–20 μl and usually 10 μl sample is adequate. This volume must be taken up by the first matrix layer and capable of being eluted again later. For safety reasons the second matrix layer which has the function of a suction layer should be able to absorb a larger volume. Suction volumes of 10–50 μl preferably 10–30 μl particularly preferably 20 μl are usually adequate for this purpose. It is expedient that the usual dimensions of the absorbent material layers are such that the suction volume of the two layers taken together is at least 30 μl and preferably at least 50 μl. Such a dimension ensures that the same amount of sample is applied on the first matrix layer of various elements according to the invention with small as well as with large drops of liquid. In order to achieve an adequate suction volume the smaller first layer usually has an area of 3×3 to 8×8 mm.

The particularly preferred arrangement of absorbent material layers described above enables a homogeneous distribution of liquid sample material to be achieved in the first layer. Due to the fact that the first layer should be completely filled with liquid sample material, concentration gradients of the analyte which are otherwise always observed in the border zones of the elements of the state of the art cannot form within this layer. Hence differences in measurement due to concentration are avoided when determining analytes.

Various arrangements of the layers on the support material can be envisaged in order to separate the first and second layer of the absorbent material in the particularly preferred embodiment described above. Quite especially preferred embodiments of absorbent materials attached to a support are shown in FIGS. 1 and 2

The element of the invention according to FIG. 1 carries layers of an absorbent material 1,2 at one end of an inert support material 3. The layers are attached to the support material 3 by means of a double-sided adhesive tape 4. Layers 1,2 are arranged on the support material 3 in such a way that they are located at the end of the support material 3. The first layer of the absorbent material 1 which is intended for the sample application is closest to the end of the support material 3. It is slightly overlapped by the second layer of the absorbent material 2 which takes up the excess liquid of the sample material when the first layer 1 is filled. At the end of the support material 3 there is a recess 5 in the support material 3 below the first layer 1. This recess 5 enables or facilitates gripping of the first layer 1 for example with tweezers in order to remove it from the element for the purpose of elution and subsequent analytical steps.

Figure 2:
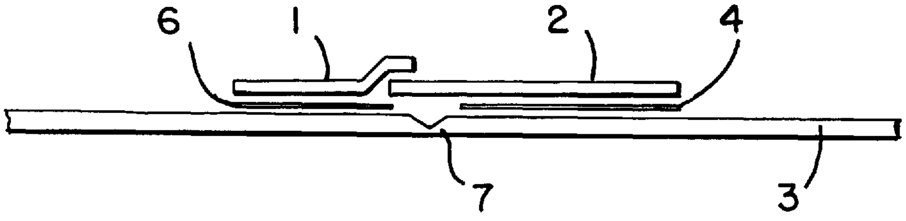
FIG. 2 is a side view of a preferred embodiment of an element according to the present invention.

In the element according to the invention shown in FIG. 2 the two layers of the absorbent material 1,2 are attached to the inert support material 3 in such a way that the two opposite ends of the support material 3 are free and can be grasped with fingers. The two layers of the absorbent material 1,2 are attached to the support material 3 by means of double-sided adhesive tape 4,6. The support material 3 has a predetermined breaking point 7 which is arranged such that the element can be divided at this point into two parts by bending, breaking or tearing such that one of the parts carries the first layer of the absorbent material 1 and the other carries the second layer of the absorbent material 2. In the case of a plastic foil as the support material 3 the predetermined breaking point 7 can be a notch. However, an appropriate perforation may also be present at this position which enables two separate parts to be obtained when the element is bent at this position.

In a further preferred embodiment the absorbent material of the system according to the invention contains auxiliary substances which are suitable for spreading the liquid sample. Such auxiliary substances are known among experts and a person skilled in the art is familiar with their use. The spreading of the sample enables a uniform homogeneous spreading of the sample material on and in the absorbent material. If for example filter paper is used as the absorbent material, this measure ensures that small samples of the filter paper containing the previously applied sample material which have been cut out of or punched out of the filter paper for elution purposes contain reproducible amounts of sample material.

In a further preferred embodiment the sample application zone of the absorbent material is marked. In this case the mark can be directly applied on or in or contained on or in the absorbent material or optionally be applied to the inert support. This makes it easier for the user to precisely apply the sample to the preferred application site. This measure also serves to increase the reproducibility of the sample application.

Furthermore it is preferred that handling instructions for the user or users of the system according to the invention are contained within it. The handling instructions are particularly preferably attached to the absorbent material and optionally to the inert support or the closable container. The handling instructions are quite especially preferably attached to the absorbent material.

The closable container of the system according to the invention serves to mechanically stabilize the absorbent material containing the sample material during storage and transport. The closable container is preferably composed of a stiffened envelope with a foldable edge, a bag with a foldable edge which can optionally be inserted into a stiff envelope or a tube that can be closed with a stopper or cap. A tube that can be closed with a stopper or cap is particularly preferably used. The tube is preferably composed of a non-deformable material that is resistant to fracture and is inert towards the sample, for example plastics, metals, alloys, paper or cardboard which are optionally coated with plastics, metals and/or alloys, ceramics or glass. The use of polyethylene, polypropylene or aluminium has proven to be particularly preferable.

In addition to the mechanical stabilization the closable container in combination with a medium that absorbs moisture ensures that there is always a lower air humidity in the inside of the container in the presence of a medium that absorbs moisture than in the outer surrounding atmosphere whereby moisture or humidity is preferably understood as water. For this purpose it is preferable to use a desiccant as is familiar to a person skilled in the art. Silica gels, zeolites or clays are quite especially preferably used as desiccants optionally also combinations thereof.

Figure 3:
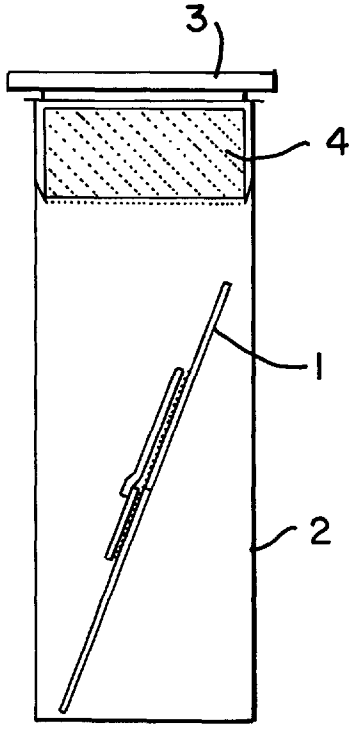
FIG. 3 is a preferred embodiment of the system of the present invention.

In a particularly preferred embodiment the moisture absorbing medium is permanently attached to the closable container or at least a part thereof. It is quite especially preferable to integrate a desiccant in the cap or stopper of a tube in such a way that a drying action occurs exclusively in the interior of the tube. Such a particularly preferred embodiment of the system according to the invention is shown in FIG. 3. FIG. 3 shows a sample carrier 1 which is inserted into a tube 2 with a close-fitting stopper 3 containing a desiccant 4.

In a further preferred embodiment the absorbent material of the system according to the invention contains one or several stabilizers for the sample material. It has for example turned out that sample material containing glycated protein that is located on an absorbent material can be stored very well without any essential change in the content of glycated protein if the absorbent material is impregnated with boric acid buffer with a pH of greater than or equal to 10.5 or if the absorbent material carries a transition metal salt. In this case the concentration of the boric acid buffer is of secondary importance. Particularly good results are obtained if the boric acid buffer has a pH value of more than or equal to 11. Suitable buffer concentrations are in the range between 300 and 1000 mmol/l, which corresponds to about 8.6–62 g/100 ml. Transition metal salts such as nickel or copper salts have a similarly good stabilizing action. Nickel salts are particularly preferred. Water-soluble transition metal salts are preferably used. Corresponding chlorides are for example well suited. In order to have an adequate stabilizing effect transition metal salt concentrations on the absorbent material of more than 5 $g/m^2$ and particularly preferably of more than 10 $g/m^2$ have proven to be suitable.

The system according to the invention is suitable for storing and transporting sample material to be analysed. Analytes which can be transported and stored in this manner include glucose and glycosylated haemoglobin ($HbA_{1c}$). However, essentially any analyte which can be dissolved by appropriate eluants and then can be measured in this solution can be measured in this manner. Basically these are for example all analytes that can be determined by means of enzymatic, immunological and other test procedures. Without wishing to limit the scope of the possible analytes, those analytes are also mentioned at this point which can be used to detect infectious diseases such as for example virus antibodies or viral components for the determination of hepatitis and HIV. The samples which contain these can be advantageously transported in this manner to the site of analysis. The use of a moisture absorbing medium in the system according to the invention ensures a safe handling by the end user since the user does not have to pay attention to sample drying before packing the absorbent material containing the sample. Furthermore a good stability of the sample material is ensured.

The invention is elucidated further in the following example.

EXAMPLE 1

Stabilizing $HbA_{1c}$ on an Absorbent Material by a Moisture Absorbent Medium

A first layer 1 of an absorbent material is fixed with the aid of a double-sided adhesive tape 4 to a polyester foil 3 of dimensions 49×6 mm with a semicircular punched hole 5 of 5 mm at a short-sided end as shown in FIG. 1 in such a way that 0.5 to 1 mm of its width is glued onto the adhesive tape 4. The later detachability is positively influenced by this relatively narrow attachment. The second layer 2 of the absorbent material is glued in a width of 5 mm or more.

A fleece which has been manufactured on a paper machine which has the following data is used for the first layer of absorbent material:

80 parts polyester fibres (fibre diameter 1.7 Dtex), 20 parts viscose, 20 parts polyvinyl alcohol; area weight 80 g/m$^2$; suction height 102 mm (DIN 53106).

This fleece was cut to a size of 6×6 mm. This matrix takes up ca. 10 $\mu$l of liquid.

A fleece is used for the second layer of absorbent material which corresponds to the first layer.

Ca. 10 $\mu$l EDTA blood (samples 1 to 3) is applied in each case to the elements manufactured in this manner and dried at room temperature for at least 2 hours.

| | |
|---|---|
| Sample 1 | EDTA blood 9.5% $HbA_{1c}$ |
| Sample 2 | EDTA blood 4.9% $HbA_{1c}$ |
| Sample 3 | sample 2 supplemented with 400 mg/dl β-D(+)-glucose |

In order to simulate a transport the sample carriers were stressed for 7 days at 20, 35 and 45° C. at a humidity of 90%+/−8%. In this experiment a portion of the sample carriers is stored in a conventional envelope, a second portion is stored in a closable bag with a foldable edge without a desiccant, a third portion is stored in a sealed bag with a foldable edge containing a molecular sieve desiccant bag (Order No. 1602080, Boehringer Mannheim GmbH, Germany) and a fourth portion is stored in a sealed tube containing a molecular sieve (Order No. 1775111, Boehringer Mannheim GmbH, Germany).

After removing the first layer of the absorbent material, the material is eluted for 1.5 to 2.5 h in 1 ml haemolysis reagent for the Tina-quant® test of Boehringer Mannheim GmbH (Germany) (order number 1 488 457). Subsequently $HbA_{1c}$ is determined according to the immunological method of determination of Boehringer Mannheim GmbH (Germany) on a Hitachi 717 instrument from Boehringer Mannheim GmbH using reagent order number 1 488 414 from Boehringer Mannheim GmbH.

The measured results are summarized in table 1 for elements in which the storage took place with and without moisture absorbing medium.

TABLE 1

Influence of 90% humidity on $HbA_{1c}$ sample carriers on the recovery (%) of the initial value

| Temperature [° C.] | Days storage | 1 | 2 | 7 |
|---|---|---|---|---|
| | Storage in an envelope | | | |
| 20 | Sample 1 | 93.2 | 95.2 | 77.1 |
| 35 | Sample 1 | 76.1 | 62.2 | <measuring range |
| 45 | Sample 1 | 51.3 | 25.2 | not determined |
| 20 | Sample 2 | 99.1 | 101.5 | 90.5 |
| 35 | Sample 2 | 92.6 | 86.4 | <measuring range |
| 45 | Sample 2 | 72.8 | 49.2 | not determined |
| 20 | Sample 3 | 103.0 | 104.7 | 97.2 |
| 35 | Sample 3 | 96.9 | 90.7 | <measuring range |
| 45 | Sample 3 | 49.1 | 54.9 | not determined |

TABLE 1-continued

Influence of 90% humidity on $HbA_{1c}$ sample carriers on the recovery (%) of the initial value

| Temperature [° C.] | Days storage | 1 | 2 | 7 |
|---|---|---|---|---|
| | Storage in a sealed bag with a foldable edge without desiccant | | | |
| 20 | Sample 1 | 96.0 | 99.7 | 79.7 |
| 35 | Sample 1 | 79.4 | 64.3 | <measuring range |
| 45 | Sample 1 | 55.5 | 39.8 | not determined |
| 20 | Sample 2 | 103.9 | 102.8 | 90.5 |
| 35 | Sample 2 | 97.7 | 87.8 | <measuring range |
| 45 | Sample 2 | 82.7 | 59.4 | not determined |
| 20 | Sample 3 | 104.0 | 105.1 | 97.9 |
| 35 | Sample 3 | 102.0 | 94.5 | <measuring range |
| 45 | Sample 3 | 89.0 | 53.6 | not determined |
| | Storage in a sealed bag with a foldable edge containing desiccant | | | |
| 20 | Sample 1 | 102.3 | 111.6 | 110.8 |
| 35 | Sample 1 | 98.8 | 106.2 | 42.8 |
| 45 | Sample 1 | 86.9 | 66.1 | <measuring range |
| 20 | Sample 2 | 101.8 | 105.6 | 105.6 |
| 35 | Sample 2 | 103.9 | 105.9 | 66.6 |
| 45 | Sample 2 | 103.5 | 89.5 | <measuring range |
| 20 | Sample 3 | 103.7 | 107.1 | 107.1 |
| 35 | Sample 3 | 102.7 | 110.2 | 67.9 |
| 45 | Sample 3 | 110.2 | 106.4 | <measuring range |
| | Storage in a sealed tube containing desiccant | | | |
| 20 | Sample 1 | 107.2 | 109.7 | 110.7 |
| 35 | Sample 1 | 101.8 | 110.0 | 111.8 |
| 45 | Sample 1 | 106.0 | 112.9 | 118.6 |
| 20 | Sample 2 | 103.9 | 107.3 | 101.8 |
| 35 | Sample 2 | 102.1 | 105.6 | 109.3 |
| 45 | Sample 2 | 105.2 | 109.3 | 112.7 |
| 20 | Sample 3 | 101.7 | 106.8 | 102.7 |
| 35 | Sample 3 | 104.4 | 107.1 | 109.2 |
| 45 | Sample 3 | 106.1 | 111.5 | 112.9 |

It can be seen that the result is that storage in a closed container which contains a moisture absorbing medium leads to such a stabilization of the non-enzymatically glycosylated protein that adequately unchanged concentration values are obtained even after temperature stress.

What is claimed is:

1. A system for storage and transport of sample material on absorbent material comprising a closable container containing a medium that absorbs moisture and a first layer and a second layer of absorbent material for absorbing a liquid sample attached to an inert support, said first layer and said second layer of absorbent material arranged next to and touching another on said inert support and contacted to enable transfer of liquid such that liquid can pass from said first layer into said second layer when said first layer is filled with liquid and said first layer can be completely separated from said second layer after a sample material has been applied and dried, said absorbent material for said first and said second layers being selected from the group consisting of papers, filter papers, fleeces, fabrics, knitted fabrics and membranes, and does not contain test reagents.

2. The system of claim 1, wherein said absorbent material further comprises auxiliary substances to spread the liquid sample.

3. The system of claim 1, wherein said absorbent material further comprises a marking on the sample application zone.

4. The system of claim 1, wherein said system is provided with handling instructions.

5. The system of claim 1, wherein said medium that absorbs moisture comprises a dessicant.

6. The system of claim 5, wherein said desiccant is selected from the group consisting of silica gels, zeolites, clays and combinations thereof.

7. The system of claim 1, wherein said closable container comprises a tube that can be closed with a member selected from the group consisting of a stopper and a cap.

8. The system of claim 7, wherein said stopper or cap comprises a non-deformable, unbreakable material that is inert towards the sample.

9. The system of claim 8, wherein said tube is made of a member selected from the group consisting of a plastic, a metal, alloys, paper, cardboard, ceramics, and glass.

10. The system of claim 9, wherein said tube is made of a material selected from the group consisting of polyethylene, polypropylene and aluminum.

11. The system of claim 1, wherein said medium which absorbs moisture is permanently attached to said closable container or to a part thereof.

12. The system of claim 1, wherein said closable container comprises a member selected from the group consisting of an envelope having a foldable edge and a bag having a foldable edge.

13. The system of claim 1, wherein said absorbent material further comprises stabilizers for the sample.

14. The system of claim 13, wherein said absorbent material comprises a boric acid buffer with a pH larger than or equal to 10.5.

15. The system of claim 7, wherein said tube comprises a non-deformable unbreakable material that is inert towards the sample.

16. The system of claim 9, wherein said paper is coated with a member selected from the group consisting of plastic, metal, and alloys.

17. The system of claim 9, wherein said cardboard is coated with a member selected from the group consisting of plastic, metal, and alloys.

18. The system of claim 13, wherein said absorbent material further comprises a transition metal salt.

* * * * *

UNITED STATES PATENT AND TRADEMARK OFFICE

CERTIFICATE OF CORRECTION

PATENT NO. : 6,231,815 B1
DATED : May 15, 2001
INVENTOR(S) : Bainczyk et al.

It is certified that error appears in the above-identified patent and that said Letters Patent is hereby corrected as shown below:

Title page,
OTHER PUBLICATIONS, insert -- Diabetes Care vol. 10, pp. 352-355 (1987). --.

Signed and Sealed this

Fifth Day of March, 2002

*Attest:*

JAMES E. ROGAN

*Attesting Officer*

*Director of the United States Patent and Trademark Office*